United States Patent [19]
Miyahara et al.

[11] Patent Number: 5,694,263
[45] Date of Patent: Dec. 2, 1997

[54] VCR HEAD CLEANING SYSTEM THAT AUTOMATICALLY DETECTS HEAD CLOGGING UPON PLAYBACK

[75] Inventors: Hideaki Miyahara, Tokyo; Jun Watanabe, Kanagawa, both of Japan

[73] Assignee: Sony Corporation, Tokyo, Japan

[21] Appl. No.: 594,274

[22] Filed: Jan. 30, 1996

[30] Foreign Application Priority Data

Feb. 8, 1995 [JP] Japan ................... 7-043521

[51] Int. Cl.$^6$ ................... G11B 15/18; G11B 5/41
[52] U.S. Cl. ................... 360/69; 360/31; 360/128
[58] Field of Search ................... 360/69, 75, 77.13, 360/771.14, 77.15, 128, 95, 31

[56] References Cited

U.S. PATENT DOCUMENTS

| | | | |
|---|---|---|---|
| 4,827,361 | 5/1989 | Yoshioka | 360/77.14 X |
| 4,970,612 | 11/1990 | Renders et al. | 360/95 |
| 5,193,033 | 3/1993 | Shimoi et al. | 360/128 X |
| 5,420,729 | 5/1995 | Lee et al. | 360/128 X |

FOREIGN PATENT DOCUMENTS 4-170706  6/1992  Japan ................... 360/128

*Primary Examiner*—Andrew L. Sniezek
*Attorney, Agent, or Firm*—Jay H. Maioli

[57] ABSTRACT

An ATF error signal is formed from a reproduction RF signal and supplied to an ATF discriminating unit 4 through an A/D converter by an ATF error arithmetic operation unit 1. The presence or absence of an ATF component is discriminated and supplied to a clog discrimination processing unit 5 by the ATF discriminating unit 4. The ATF discrimination processing unit 5 determines that a head clog has occurred in the case where the ATF component exists and the RF signal which is supplied from an RF discriminating unit 9 doesn't exist. A head cleaning is executed by controlling a loading motor 16 by a motor driver 14 on the basis of a cleaning process control 11 and making a head cleaning mechanism 17 operative.

8 Claims, 5 Drawing Sheets

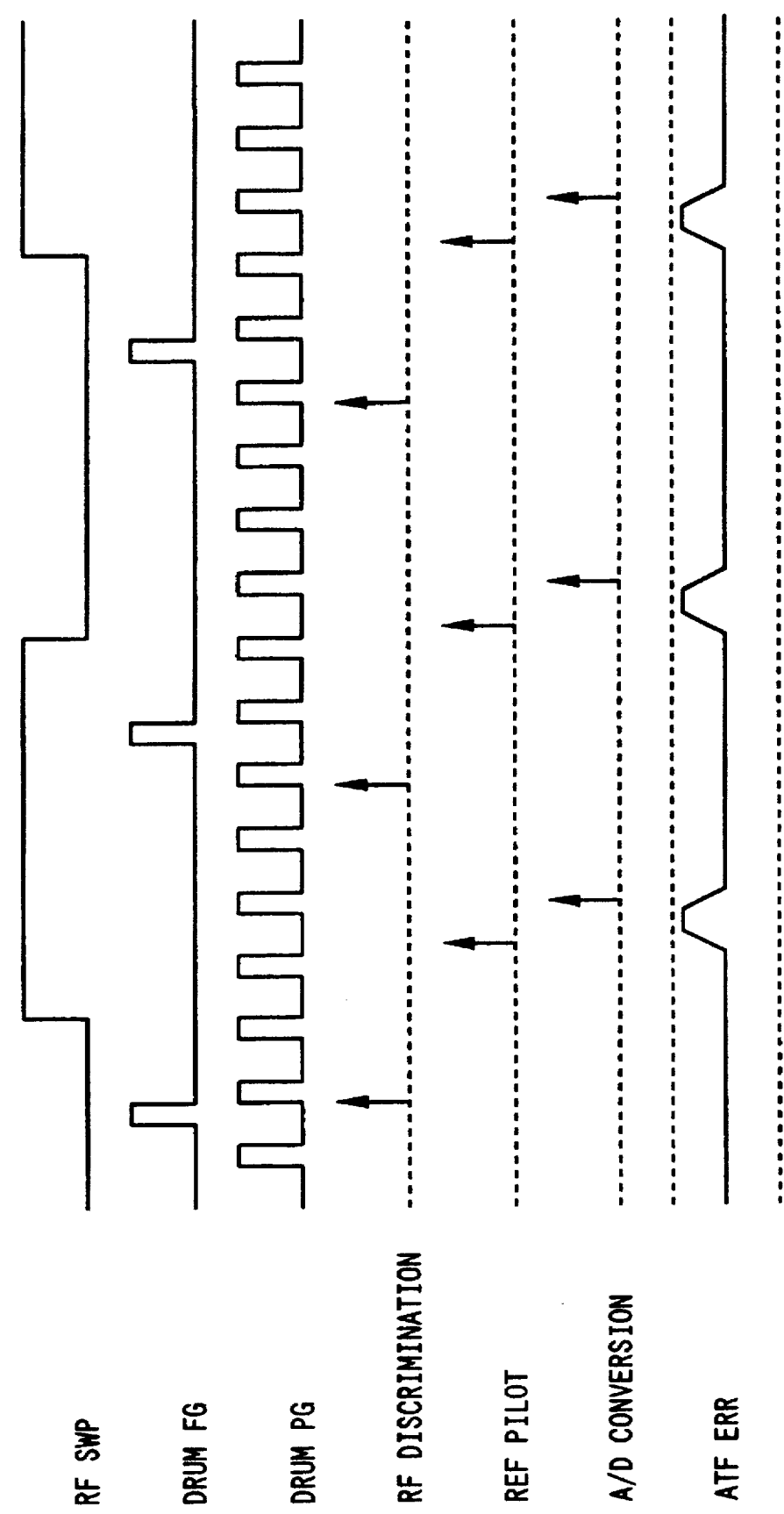

VCR HEAD CLEANING SYSTEM THAT AUTOMATICALLY DETECTS HEAD CLOGGING UPON PLAYBACK

BACKGROUND OF THE INVENTION

1. Field of the Invention

The invention relates to a recording and reproducing apparatus using a magnetic head and, more particularly, to an apparatus for detecting a head clog and automatically performing a head cleaning or performing a state display on the basis of the detection result.

2. Description of the Related Art

According to a conventional head cleaning method, when an operation to wrap a magnetic tape around a rotary head type drum is executed, a head cleaner is made operative for a predetermined time and comes into contact with the magnetic head, thereby performing a cleaning irrespective of the presence or absence of dirt on the head and reducing a frequency of a defect due to the head clog (choke of the head). As another method, a method whereby when a temporary stop just after a recording operation used in a video camera recorder or a recording cancellation is executed, a portion which ought to have been recorded is reproduced and the presence or absence of a signal is detected, thereby discriminating the presence or absence of an abnormality of the magnetic head and displaying a warning to the user.

In the former case, however, since a state of the magnetic head is not determined so long as loading and unloading of the magnetic tape are not executed, a head cleaning is not performed. Further, although a manual head cleaning button has been put into practical use, in the case where a video tape recorder (VTR) has a reservation recording function, since the user doesn't exist at that location, there is a problem such that the user cannot manually cope with such a case. Further, in the latter case, since a determination about the head clog can be executed only after the recording, even when a warning is displayed, the head clog cannot be determined in the case of reproducing the recorded tape.

OBJECTS AND SUMMARY OF THE INVENTION

It is, therefore, an object of the invention to provide a magnetic recording and reproducing apparatus which can detect the presence or absence of an abnormality of a head and can automatize a head cleaning operation and can display the state of the recording head.

The invention relates to a magnetic recording and reproducing apparatus in which an information signal is recorded and reproduced to/from a recording medium by a magnetic head, characterized by comprising:

means for separating a low frequency component and a high frequency component of a reproduction signal, respectively;

head clog discriminating means for comparing levels of the low frequency component and the high frequency component of the reproduction signal and, when the low frequency component exists and the high frequency component does not exist, for discriminating that there is a head clog; and head cleaning means or state display means which is controlled by the head clog discriminating means.

In the case where the high frequency component of the output cannot be obtained upon reproduction of the recorded tape in many cases, a spacing loss by dirt of a head tip portion occurs. Therefore, according to an 8 mm VTR, for example, an ATF (automatic tracking following) signal recorded on the low frequency side is hardly influenced by the spacing loss. On the other hand, a reproduction level of a luminance FM signal recorded on the high frequency side remarkably deteriorates. By using an output difference by the spacing loss, the presence or absence of the head abnormality can be detected and the head cleaning operation can be automatized.

The above, and other, objects, features and advantages of the present invention will become readily apparent from the following detailed description thereof which is to be read in connection with the accompanying drawings.

BRIEF DESCRIPTION OF THE DRAWINGS

FIG. 2 is a timing chart of an example of the magnetic recording and reproducing apparatus according to the invention;

DETAILED DESCRIPTION OF THE PREFERRED EMBODIMENTS

An embodiment of the invention will now be described hereinbelow with reference to the drawings. The embodiment relates to a helical-scan type VTR in which color video signals are alternately recorded on a magnetic tape by a pair of rotary heads which face each other at 180°. Pilot signals of four frequencies on the lower frequency side of a band of a recording signal are sequentially supplied to tracks.

Figure 1:
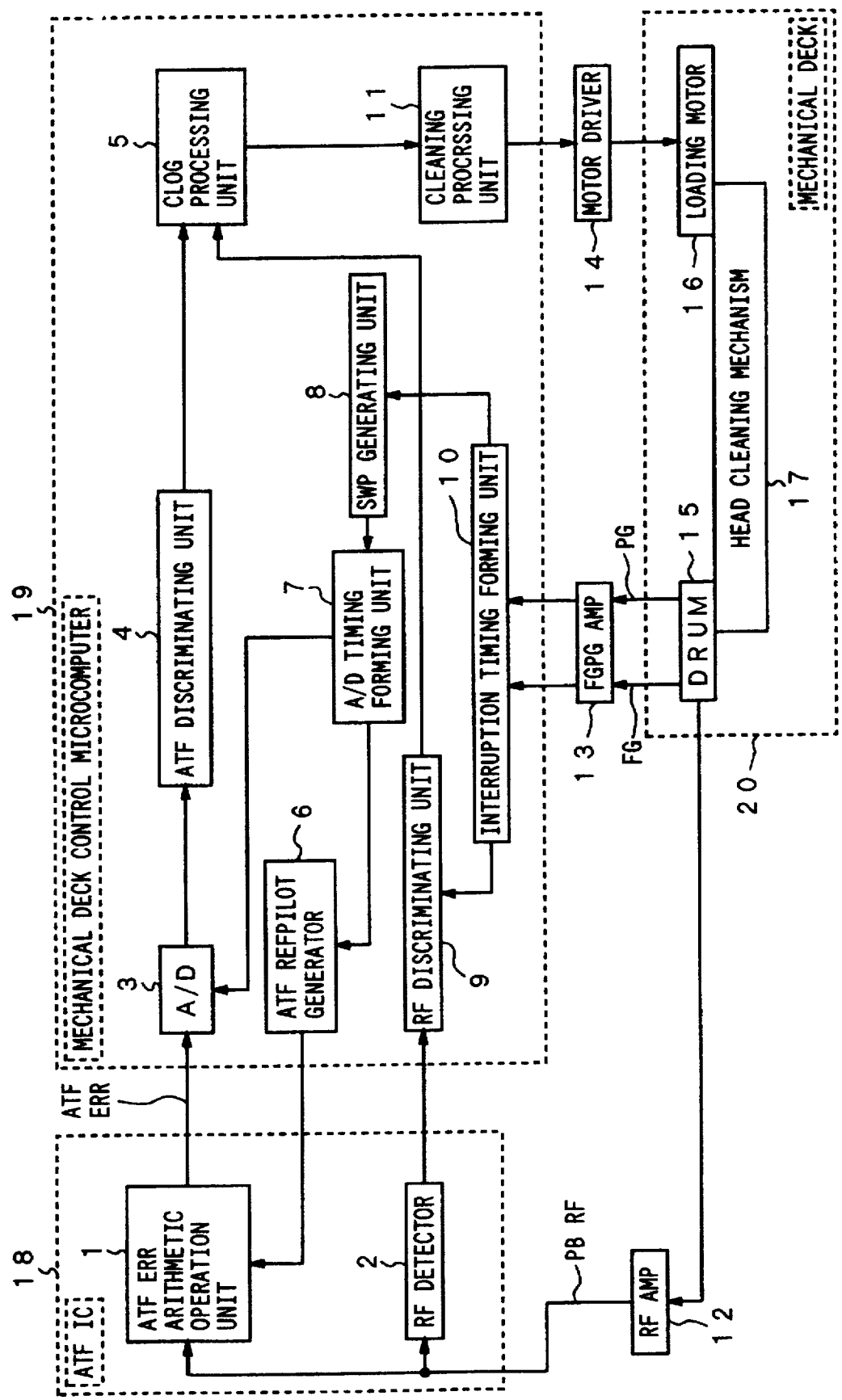
FIG. 1 is a block diagram of an embodiment of a magnetic recording and reproducing apparatus to which the invention can be applied.

As shown in FIG. 1, a head clog detecting and automatic cleaning system is mainly constructed by an IC 18 for an ATF (automatic tracking following), a mechanical deck control microcomputer 19, and a mechanical deck 20. Operation contents are separated to an ATF discrimination processing unit, an RF discrimination processing unit, and a head clog discriminating/head cleaning processing unit. Subsequently, description of each unit of the system and operation contents of every processing unit will now be shown.

First, the ATF IC 18 is constructed by an ATF error arithmetic operation unit 1 and an RF detector 2. The mechanical deck control microcomputer 19 is constructed by an A/D converter 3, an ATF discriminating unit 4, a clog discrimination processing unit 5, an ATF REFPILOT (reference pilot signal) generator 6, an A/D timing forming unit 7, an SWP (switching pulse) generating unit 8, an RF discriminating unit 9, an interruption timing forming unit 10, and a cleaning process control unit 11. The mechanical deck 20 is constructed by a drum 15, a loading motor 16, and a head cleaning mechanism 17.

The ATF error arithmetic operation unit 1 extracts an ATF signal from a reproduction RF signal which is supplied from an RF amplifier 12 by a band pass filter and arithmetically operates with an ATF reference pilot signal which is outputted from the ATF reference pilot signal generator 6, thereby forming an ATF error signal. The formed ATF error signal is supplied to the A/D converter 3. The RF detector 2 detects whether the reproduction RF signal has been outputted from the reproduction RF signal that is supplied from the RF amplifier 12 or not by using a comparator circuit. The detection signal is supplied to the RF discriminating unit 9.

The RF discriminating unit 9 samples a signal supplied from the RF detector 2 on the basis of interruption timing from the interruption timing forming unit 10 and discriminates the presence or absence of the RF signal. The A/D converter 3 converts the ATF error signal supplied from the ATF error arithmetic operation unit 1 to a digital value on the basis of timing from the A/D timing forming unit 7. The converted ATF error signal is supplied to the ATF discriminating unit 4. The ATF discriminating unit 4 discriminates the presence or absence of the ATF signal by comparing the ATF error value with a reference level. The discrimination result of the ATF discriminating unit 4 and the discrimination result of the RF discriminating unit 9 mentioned above are supplied to the clog discrimination processing unit 5.

The clog discrimination processing unit 5 discriminates whether a head clog has occurred or not from the presence or absence of the ATF signal and the presence or absence of the reproduction RF output. The discrimination result is supplied to the cleaning process control unit 11. The cleaning process control unit 11 automatically executes the head cleaning when the occurrence of the head clog is determined. The loading motor 16 of the mechanical deck 20 is controlled from the cleaning process control unit 11 through a motor driver 14. A head cleaning mechanism for cleaning a rotary head is operated by the loading motor 16 and the head cleaning is executed by pressing a roller for a short time.

Pulses FG and PG are supplied from the drum 15 to an FGPG amplifier 13. A waveform shaping and the like of the drums FG and PG are executed by the FGPG amplifier 13 and an output of the FGPG amplifier 13 is supplied to the interruption timing forming unit 10. An interruption timing of the drums FG and PG is formed by the interruption timing forming unit 10. The interruption timing formed is supplied to the SWP generating unit 8 and RF discriminating unit 9. The SWP generating unit 8 generates an SWP by a calculation using the interruption timings of the pulses FG and PG. The SWP forms a timing decided by an edge time of the SWP by the A/D timing forming unit 7 and the timing is supplied to the A/D converter 3 and ATF reference pilot signal generator 6. The ATF reference pilot signal generator 6 changes a frequency of the ATF reference pilot signal on the basis of the timing from the A/D timing forming unit 7.

An example of the operation of the ATF discriminating unit 4 will now be described. The RF SWP in FIG. 2 is formed by the SWP generating unit 8 and one period is synchronized with one rotation of the drum. The ATF reference pilot signal (REF PILOT) is generated from the ATF reference pilot signal generator 6 on the basis of the timing for the RF SWP shown in FIG. 2. Further, in this instance, a frequency of the ATF reference pilot signal is set so that the level of the ATF error signal is maximum in a tracking state.

Figure 3A:
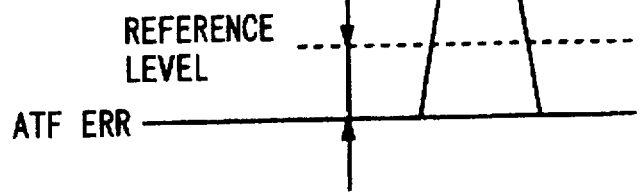
FIGS. 3A and 3B are schematic diagrams which are used for explanation of an ATF signal according to the invention.
Figure 3B:
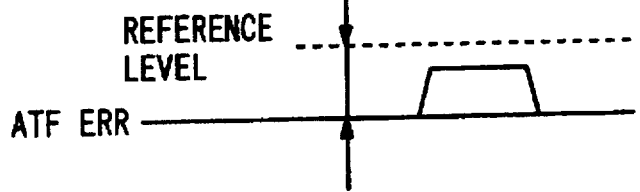

The ATF error arithmetic operation unit 1 arithmetically operates the ATF reference pilot signal and the ATF signal and outputs an ATF error signal of analog values (0–5V). The ATF error signal is A/D converted on the basis of the timing for the RF SWP as shown in FIG. 2 and the presence or absence of the ATF signal is discriminated by the ATF discriminating unit 4. The ATF discriminating unit 4 compares the value with a reference level as shown in FIGS. 3A and 3B. In the case where the level of the ATF error signal is higher than the reference level (FIG. 3A), it is determined that the ATF component exists and in the case where the level of the ATF error signal is lower than the reference level (FIGS. 3A and 3B), it is determined that no ATF component exists.

An example of the operation of the RF discriminating unit 9 will now be described. The RF detector 2 forms detection signals (H, L) indicative of the presence or absence of the RF signal by using the comparator circuit. The RF discriminating unit 9 samples the detection signal on the basis of the timing of RF discrimination shown in FIG. 2 and discriminates the presence or absence of the reproduction RF signal.

An example of the operations of the clog discrimination processing unit 5 and cleaning process control unit 11 will now be described on the basis of the discrimination results. A discrimination of the head clog is executed by the clog discrimination processing unit 5 on the basis of the discrimination results of the ATF signal and RF signal. When it is discriminated that the ATF signal exists and that no RF signal exists, it is determined that the head clog has occurred. When the head clog is ascertained, the head cleaning process is executed. In place of performing the head cleaning, it is also possible to display a warning of the occurrence of the head clog together with the head cleaning.

Figure 4A:
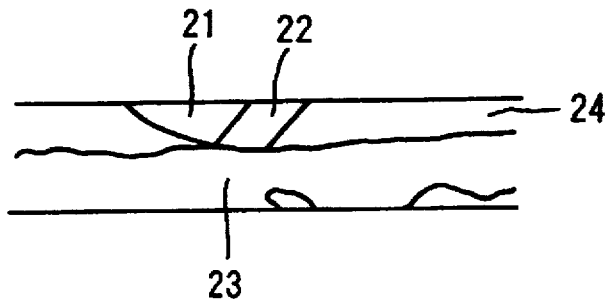
FIGS. 4A and 4B are schematic diagrams of an example of a head clog according to the invention.
Figure 4B:
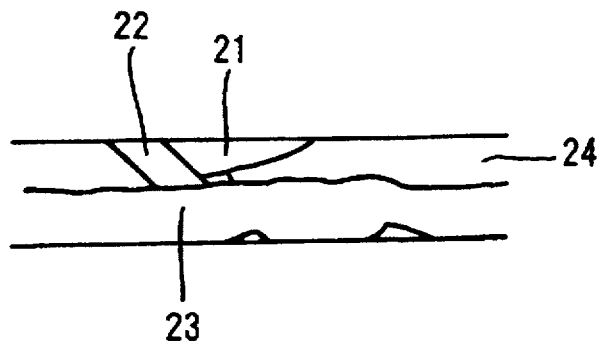

An example of the head in which the head clog is ascertained is shown in FIGS. 4A and 4B. FIG. 4A enlargedly shows portions near a gap of the head of one channel and FIG. 4B enlargedly shows portions near a gap of the head of another channel. Since the head is set to a magnetic closed circuit for a ferrite portion 24 in a sendust portion 22, a glass portion 21 is charged. A clog portion 23 is seen on the sendust portion 22.

Figure 5:
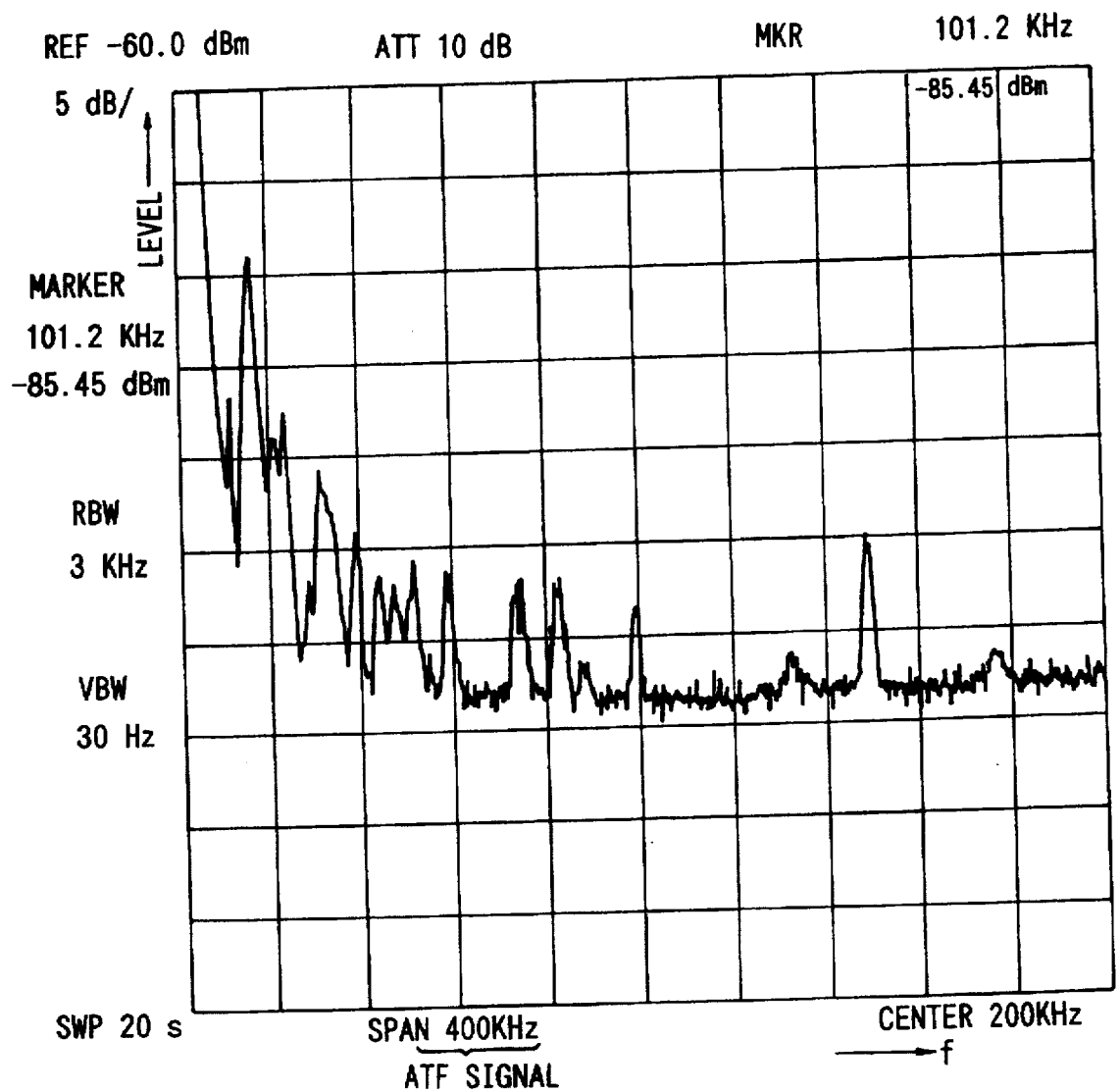
FIG. 5 is an example of a reproduction level of channel 1 of the head clog.
Figure 6:
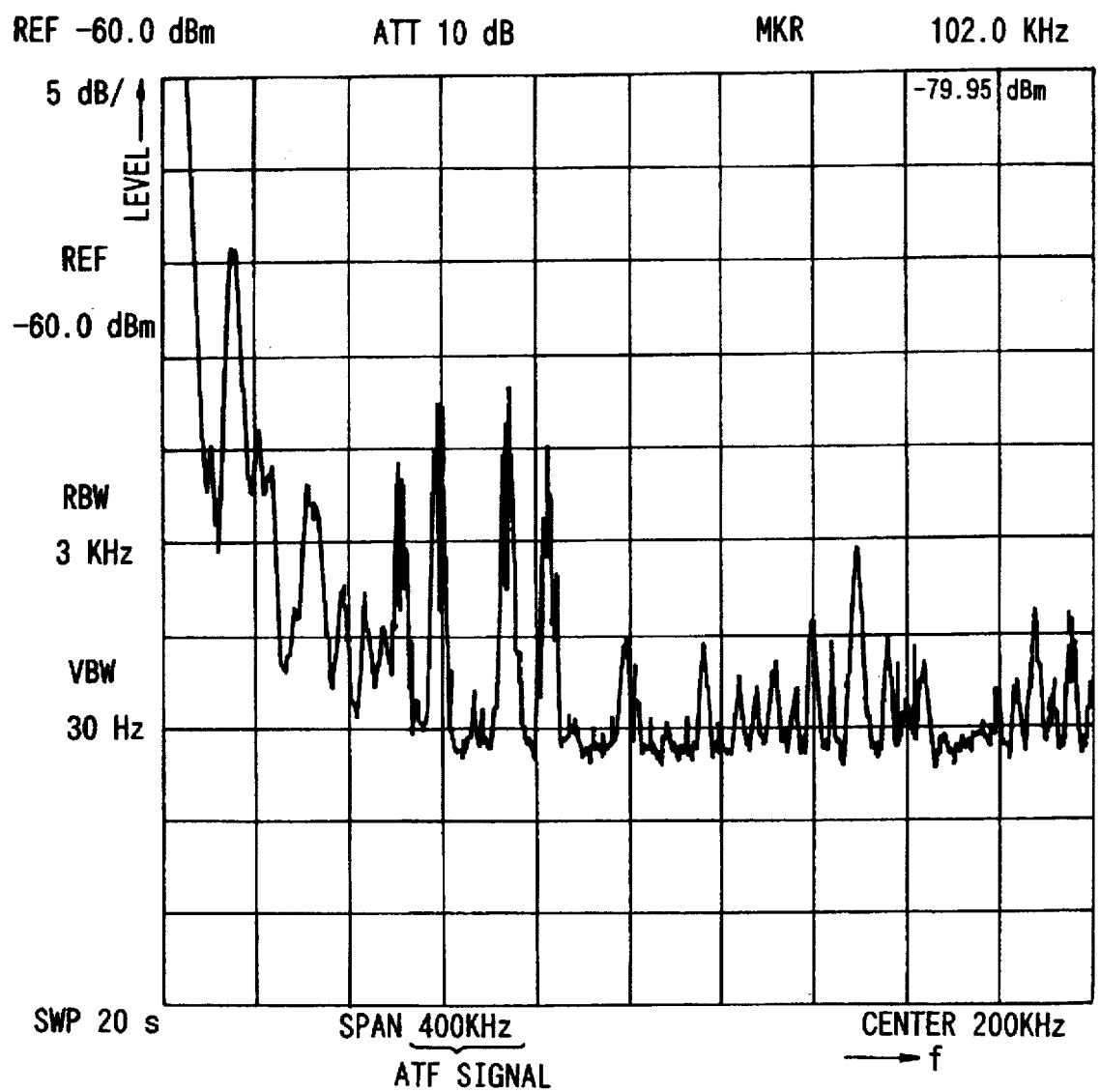
FIG. 6 is an example of a reproduction level of channel 2 of a head clog.

FIG. 5 shows a measurement example of frequency characteristics of one channel of the reproduction RF signal in the case where the head clog occurred. Although the ATF signal recorded on the low frequency side as shown in the diagram is reproduced at a relatively large level, the level of the recording signal recorded on the high frequency side remarkably decreases due to a spacing loss. Similarly, FIG. 6 shows a measurement example of frequency characteristics of another channel of the reproduction RF signal. With respect to such another channel, a similar tendency can be also seen with the above one channel.

According to the invention, the precision at which the presence or absence of a head abnormality can be detected is remarkably raised by utilizing the output difference by the spacing loss and an automatizing precision of the head cleaning can be remarkably improved. According to the above embodiment, since a pilot signal for tracking control is used as a signal of the low frequency component, there is an advantage such that a special signal or circuit construction is not needed for detecting the head clog.

The present invention is not limited to the forgoing embodiment but many modifications and variations are possible within the spirit and scope of the appended of the invention.

What is claimed is:

1. A magnetic recording and reproducing apparatus in which a signal is recorded and reproduced to/from a recording medium by a magnetic head mounted on a rotary head drum, wherein said signal is comprised of an information signal and a tracking control pilot signal recorded on said recording medium, and the rotation of the head drum produces a phase generatingpulse and a field generating pulse, the apparatus comprising:

timing generating means for generating a timing signal based on said phase generating pulse and said field generating pulse;

means for separating a low frequency component and a high frequency component of said signal reproduced by said magnetic head at a timing controlled by said timing signal generated by said timing generating means, wherein said high frequency component is said recorded information signal and said low frequency component is said tracking control pilot signal;

head clog discriminating means for comparing a level of said low frequency component and a level of said high frequency component of said reproduced signal and, in the case where said low frequency component exists and said high frequency component does not exist, for discriminating that such a state is a head clog; and head cleaning means for cleaning said recording and reproducing head controlled by said head clog discriminating means.

2. The magnetic recording and reproducing apparatus according to claim 1, further comprising:

DC voltage converting means for converting said low frequency component and said high frequency component of said reproduced signal from said magnetic head to DC voltages, respectively, and wherein said head clog discriminating means executes a head clog discrimination on the basis of output information from said DC voltage converting means.

3. The apparatus according to claim 1, wherein said head cleaning means has a motor for pressing a roller to said magnetic head.

4. The apparatus according to claim 1, further comprising state display means for displaying a state of a recording and reproducing head.

5. A magnetic recording and reproducing apparatus in which a signal is recorded and reproduced to/from a recording medium by a magnetic head mounted on a rotary head drum, wherein said signal is comprised of an information signal and a tracking control pilot signal recorded on said recording medium, and the rotation of the head drum produces a phase generating pulse and a field generating pulse, the apparatus comprising:

timing generating means for generating a timing signal based on said phase generating pulse and said field generating pulse;

means for separating a low frequency component and a high frequency component of said signal reproduced by said magnetic head at a timing controlled by said timing signal generated by said timing generating means, wherein said high frequency component is said recorded information signal and said low frequency component is said tracking control pilot signal;

head clog discriminating means for comparing a level of said low frequency component and a level of said high frequency component of said reproduced signal and, in the case where said low frequency component exists and said high frequency component does not exist, for discriminating that such a state is a head clog;

head cleaning means for cleaning said recording and reproducing head controlled by said head clog discriminating means; and state display means for displaying a state of a recording and reproducing head controlled by said head clog discriminating means.

6. The magnetic recording and reproducing apparatus according to claim 5, further comprising:

DC voltage converting means for converting said low frequency component and said high frequency component of said reproduced signal from said magnetic head to DC voltages, respectively, and wherein said state display means executes a head clog discrimination on the basis of output information from said DC voltage converting means.

7. The apparatus according to claim 5, wherein said head cleaning means has a motor for pressing a roller to said magnetic head.

8. A helical-scan type magnetic tape recording and reproducing-apparatus including a magnetic head mounted on a rotary head drum for recording and generating from a tape a reproduction RF signal, and a low frequency tracking control pilot signal, wherein rotation of said rotary head drum produces a phase generating pulse and a field generating pulse, the apparatus comprising:

interruption timing forming means for controlling a system timing based on said phase generating pulse and said field generating pulse;

ATF discrimination processing means for discriminating whether said low frequency tracking control pilot signal is present on said tape at said system timing controlled by said interruption timing forming means;

RF discrimination processing means for discriminating whether said high frequency RF signal is present on said tape at a timing controlled by said interruption timing forming means;

head clog discriminating means for discriminating a head clog when said low frequency tracking control signal is found to be present by said ATF discrimination means and said high frequency RF signal is found to be absent by said RF discrimination processing means; and head cleaning means controlled by said head clog discriminating means for cleaning said drum.

* * * * *